United States Patent

Davis et al.

[11] Patent Number: 5,770,070
[45] Date of Patent: Jun. 23, 1998

[54] RADIOACTIVE WASTE DISPOSAL CARTRIDGE

[75] Inventors: Thomas E. Davis, Moss Beach; Henry L. Schwartz, San Francisco, both of Calif.

[73] Assignee: Genomyx Corporation, Foster City, Calif.

[21] Appl. No.: 316,733

[22] Filed: Oct. 3, 1994

[51] Int. Cl.⁶ .................................................. B01D 27/02
[52] U.S. Cl. .......................... 210/266; 210/282; 210/283; 210/352
[58] Field of Search .................................. 210/266, 282, 210/283, 503, 284, 290, 352

[56] References Cited

U.S. PATENT DOCUMENTS

| | | | |
|---|---|---|---|
| 3,420,709 | 1/1969 | Barrett et al. | 210/503 |
| 3,561,602 | 2/1971 | Molitor | 210/266 |
| 4,773,997 | 9/1988 | Butte | 210/282 |
| 5,211,851 | 5/1993 | Meurer | 210/283 |
| 5,368,729 | 11/1994 | Stefkovich et al. | 210/282 |

FOREIGN PATENT DOCUMENTS

| | | |
|---|---|---|
| 0633066 | 1/1995 | European Pat. Off. . |
| 2053551 | 5/1972 | Germany . |
| 3913814 | 7/1990 | Germany . |
| 60-058543 | 4/1985 | Japan . |

OTHER PUBLICATIONS

Kaczorowski et al., 1994, "A Method for Removal of Radioactive Nucleotides from Electrophoretic Buffers", Circle Reader Service No. 160, vol. 16, No. 6.

*Primary Examiner*—Ivars Cintins
*Attorney, Agent, or Firm*—McDonnell Boehnen Hulbert & Berghoff

[57] ABSTRACT

This invention relates to the use of a unique apparatus and method for extracting radioactive components from liquids, such as electrophoresis buffers. In the present invention, the radioactive liquid is pumped or transported by other suitable means and is passed through a cartridge having an elongated chamber that contains an exchange medium. The exchange medium, i.e. exchange resin, is contained within the elongated chamber between an upper frit and a lower frit. Further, the cartridge has a means within the elongated chamber for retaining pressure between the upper frit and the lower frit. The nucleotides, being charged molecules, bind to the exchange medium and are removed from the liquid. The liquid then exits the cartridge and has such a low amount of radioactivity that it can be disposed of to a conventional drain.

15 Claims, 7 Drawing Sheets

| Point | cpm.y | vol.y |
|---|---|---|
| 0 | 25 | 70 |
| 1 | 20 | 140 |
| 2 | 20 | 230 |
| 3 | 24 | 310 |
| 4 | 24 | 380 |
| 5 | 18 | 470 |
| 6 | 28 | 870 |
| 7 | 18 | 1000 |
| 8 | 26 | 1500 |
| 9 | 24 | 2000 |
| 10 | 18 | 2500 |
| 11 | 21 | 2650 |

Performance of Radionucleotide Extraction Cartridge

RADIOACTIVE WASTE DISPOSAL CARTRIDGE

BACKGROUND OF THE INVENTION

1. Field of the Invention

This invention relates to an apparatus and method for treating radioactive waste. More particularly, this invention relates to an apparatus and method for treating radioactive waste generated from gel electrophoresis. Gel electrophoresis is a common technique widely used for separating DNA fragments and determining the "sequence" of DNA. Many gel electrophoresis procedures use DNA that has been rendered radioactive through the incorporation of radionucleotides. During gel electrophoresis the electrophoresis buffer generally becomes contaminated with both free and incorporated nucleotides necessitating its disposal as radioactive waste. The handling and disposal of liquid waste is both hazardous and costly. Until the present invention, there was no convenient and practical way to extract radioactive components from electrophoresis buffer.

Another application of the present invention is to treat radioactive waste generated in the use of radioactive labelled molecular probes. Those of skill in the art will recognize the different applications of the present invention for treating radioactive waste.

2. Description of the Prior Art

Gel electrophoresis is a fundamental biochemical separation technique that forms the basis for distinguishing a variety of biologically important molecules on the basis of size, charge or a combination thereof. Specific examples of biological molecules advantageously separated by gel electrophoresis include proteins and nucleic aids. Electrophoresis is usually performed in a gelled (e.g., agarose) or polymerized (e.g., polyacrylamide) media (generically termed a "gel") that contains an electrically conducting buffer. Electrophoresis is performed wherein a voltage is applied via chemically inert metal electrodes across the cross-sectional area of the gel. The biological sample of interest is placed into pre-formed sample wells in the gel, usually at one end of the gel, and the polarity of the applied voltage is arranged so that the biological sample migrates through the gel towards one of the electrodes (usually positioned at the opposite end of the gel from the samples). Where appropriate, the inverse linear relationship between migration distance and molecular size is maintained by the addition of chemical denaturants (such as urea, formamide, or sodium dodecyl sulfate) to the gel and electrophoresis buffer.

A particular application of gel electrophoresis is the separation of single-stranded DNA fragments in the determination of the nucleotide sequence of a nucleic acid of interest. To this end, a collection of single-stranded DNA fragments is generated either by chemical degradation of the nucleic acid (using the Gilbert method, see e.g., Maxam and Gilbert (1980), *Methods Enyme*, 65, p499–500) or by replacement DNA synthesis using a polymerase (using the Sanger method, see e.g., Sanger, F., Niklen, S., and Coulson, A. R. (1977) *Proc. Nat. Acad. Sci. USA* 74, p5463–5467). This collection of single stranded DNA fragments includes a fragment corresponding to each position in the sequence to be determined; in the most frequently-used sequencing method, this correspondence is directly related to the distance from a fixed site of initiation of polymerization at a primer that is annealed to the nucleic acid to be sequenced. Thus, determination of the desired sequence depends on the separation of each of the fragments, which differ in length by only a single nucleotide.

Traditionally, the identity of each of the possible nucleotides at each position (adenine, guanine, cytosine or thymidine) is distinguished by performing a sequencing reaction specific for each ending nucleotide in separate chemical reaction mixtures. Thus, each sequencing experiment is typically performed in 4 separate tubes, wherein are generated a collection of fragments each ending at a position corresponding to the terminating nucleotide used in that reaction. A nucleotide sequence is thereafter determined by performing denaturing gel electrophoresis on each of a set of 4 reactions, each reaction electrophoresed individually in adjacent lanes of a single sequencing gel. The presence of a band at a position in a nucleotide-specific lane of such a gel indicates the identity of that nucleotide at that position in the sequence. Using conventional techniques, each of the fragments is radiolabeled, and the bands are visualized after electrophoresis by autoradiography.

The radiolabelling is accomplished by using radionucleotides that attach to the fragments. As previously noted above, during gel electrophoresis, the electrophoresis buffer generally becomes contaminated with both free and incorporated nucleotides necessitating its disposal as radioactive waste.

Moreover, the radioactive electrophoresis buffer is dangerous and must be handled with caution. Prior to the present invention, available electrophoresis units have no provision for disposal of the buffer solutions and require manual emptying of the lower buffer chamber (DNA sequencing instruments have an upper and a lower buffer chamber, both containing similar buffers). Radioactive components are collected in the lower buffer chamber. This is because excess radioactive nucleotides and DNA strands elute off the bottom of the electrophoresis gel and into the lower buffer chamber during the run. Typically the lower buffer chamber is shaped like a rectangular tray without special provisions for emptying. The tray is simply tipped at an angle and the liquid is poured through a funnel and into a waste disposal container. The procedure is awkward and it is very common for practitioners to splash and spill small amounts of the radioactive liquid onto themselves and their surroundings.

Attempts by others to address this problem include using an exchange resin to remove the radioactivity from the liquid to the level where the treated liquid can then be disposed of according to the specific Nuclear Regulatory Commission rules and regulations (Title 10, Chapter 1, Code of Federal Regulations—Energy, 1992, Part 20, Standards for protection against radiation). However, these attempts have given rise to operational problems. See e.g., "A Method for Removal of Radioactive Nucleotides from Electrophoretic Buffers", T. Kaczorowski et al., University of Wisconsin et al., *BioTechniques*, Vol. 16, No. 6, 1994). This reference teaches that it is very important not to allow the resin to dry out during decontamination. It is believed that this reference requires a wet resin because otherwise, the resin matrix would cease to be uniform because it would shrink and develop cracks as it dried out. Keeping the resin wet as required in this reference would lead to operational problems such as always keeping the resin wet during decontamination by running a non-contaminated solution through the resin both before and after decontamination of the liquid to be treated, and always keeping the resin wet thereafter if the resin is to be used again for treatment of additional radioactive waste. This in turn would require additional operator attention.

In addition, this reference requires that the resin bed be prepared prior to decontamination by suspending the resin in distilled water, apparently to create a wet, uniform bed without cracks. Further, this reference requires the operator to form a sufficient liquid head above the resin before the contaminated liquid is allowed to pass through the resin. Moreover, this reference fails to teach that non-ionic species of S-35 are created during cycle sequencing, and fails to teach how such species would be removed.

SUMMARY OF THE INVENTION

This invention relates to the use of a unique apparatus and method for extracting radioactive components from the electrophoresis buffer. In the present invention, the radioactive liquid generated by gel electrophoresis (for example) is passed through a cartridge that contains an anion exchange medium. The nucleotides, being negatively charged molecules, bind to the anion exchange medium and are removed from the liquid. The liquid then exits the cartridge and can be disposed of to a conventional drain because the level of radioactivity of the treated liquid is low enough to do so under U.S. Nuclear Regulatory Commission Rules and Regulations. Alternatively, the treated liquid can be deposited into a storage vessel, and can be disposed of as desired or recycled for further use.

In addition, the preferred embodiment has a unique, compacted matrix of exchange resin between a porous upper frit and a porous lower frit. In the preferred embodiment, this matrix is made using a spring loaded upper frit to maintain the upper frit in contact with the matrix. The preferred embodiment has a porous upper frit with a thickness and porosity that has been chosen in order to provide sufficient back-pressure so that a "liquid head" is formed by allowing the contaminated liquid to simply drip onto the top of the upper frit. This liquid head reaches a certain height that is then maintained until the end of the decontamination process, wherein the last remaining contaminated liquid is drawn through the cartridge. It is surprising that a liquid head can be properly maintained even as the contaminated liquid is drawn through the cartridge. This liquid head provides additional operational benefits. Specifically, this preferred construction helps to reduce channeling of the radioactive liquid as it moves through the cartridge, and thus helps improve the extraction of radioactive particles from the liquid.

Those skilled in the art of column chromatography will recognize that there are a number of factors that are critical to successful extraction chromatography.

One such factor is "bed uniformity". Chromatography is typically carried out using fine particles or beads, capable of selectively binding or adsorbing the solute of interest. These particles are tightly packed into the column (or cartridge) and great care is taken to exclude air bubbles and other artifacts which might cause non-uniformities in the column bed. It is critical that the bed is uniform throughout the column so that liquid passing through any given portion of the bed will encounter the same density of matrix particles and will thus be subject to identical extraction potentials. The porous beads swell upon hydration and contract upon drying. As a result, chromatographers are careful to never allow the column bed to dry out once it has been packed for fear that cracks and void spaces should form.

As noted above, the present invention includes a spring loaded frit placed on top of the column bed to maintain an evenly packed bed throughout cycles of drying and rehydration. This innovation allows a column to be used for many applications, such as the daily extraction of DNA sequencing electrophoresis buffer, where the column will dry out between uses.

Another critical factor familiar to the chromatographer is that of "flow uniformity." For maximum extraction efficiency, the liquid flow should be substantially uniform through the column. The liquid typically enters the column through a small orifice in the top of the column and then must be distributed across the surface of the bed in a manner so that uniform flow downward through the column is achieved. One method by which this can be achieved is through the use of a "liquid head". A liquid head is simply a liquid layer that sits atop the column bed, into which the liquid just entering the column can disperse. If the column is appropriately designed, then the action of the fresh liquid entering into the liquid layer will be sufficient to mix the liquids. When properly done, the chemical composition of the liquid entering into the column bed should be very nearly identical at all points. This uniformity of chemical flow through the column allows one to realize the full extraction potential of the matrix contained within.

There are two methods by which a liquid head is typically generated on a column. The first is a manual technique where a fluid layer is gently layered atop the bed and the feed tubing for the column is filled, taking care to remove all air bubbles. The disadvantage of this procedure is that the column must be "primed" by hand before each use.

The second method is to simply pump liquid onto the top of the column bed until the space above the column is filled. As long as there is some resistance to flow through the column, a liquid head will be maintained. The disadvantage of this method is that if the column should become clogged for any reason creating a rise in pressure, then the tubing that feeds the column can leak or burst. While in some cases this may be an acceptable outcome of system failure, in an application such as the treatment of radioactive waste, this is entirely unacceptable. In cases where safety is a concern, liquid is always drawn through the bottom of the column using either gravity or suction generated by a pump. This prevents the buildup of pressure within the column should it become clogged. One disadvantage, however, is that the column must be hand primed in order to generate the liquid head.

This invention teaches that through the judicious selection and arrangement of porous frits, it is possible to create a column that will automatically generate its own liquid head when the liquid is drawn from the bottom using a pump.

The combination of both the spring loaded upper frit with the ability to automatically create a liquid head allows one, for the first time, to repeatedly use an extraction column in applications where it will run dry in between uses.

In addition, the preferred embodiment has an activated carbon (i.e., charcoal) layer within the cartridge that adsorbs non-ionic forms of the radiolabeled particles that may be present either as contaminants or that have been created during the synthesis or electrophoresis of the DNA. For example, when the isotope sulfur-35 is used, a non-ionic form of the radioisotope that cannot be captured using ion exchange is created (see Table 1). This compound(s), which is believed to include hydrogen sulfide, is removed from the effluent stream by adsorption to carbon. The hydrogen sulfide is believed to contain radioactive sulfur and/or sulfur compounds.

TABLE 1

Adsorption of the non-ionic species present in electrophoresis buffer from sulfur-35 containing DNA. One milliliter portions of buffer that had been treated with Dowex ™ 1 × 8/Acetate resin were treated with various adsorbents and chromatographic media. Background = 19 counts per minute (cpm) (+/− 4.4).

| Treatment | cpm |
|---|---|
| no treatment | 89 |
| alumina | 77 |
| anion exchange resin | 74 |
| cation exchange resin | 65 |
| Amberlite ™ XAD4 | 68 |
| carbon | 21 |

In the preferred embodiment, the cartridge is also made of shielding layer that is of suitable material and thickness to protect the operators from radiation from the concentrated radioactive material retained in the cartridge.

Further, in the preferred embodiment, the radioactive liquid generated by gel electrophoresis is pumped or transported by other suitable means from the electrophoresis device and through the cartridge.

The means by which the liquid is pumped or transported by other means can be any practical and commonly known pumping or transportation means. For example, hydrostatic pressure can be used to transport, i.e., drive, the liquid.

In a preferred embodiment of the invention, a pump is used and can be placed in the same housing as the cartridge. In the preferred embodiment, the pump is located on the effluent side of the cartridge and pulls the radioactive liquid from the lower buffer chamber or reservoir of a manual or automated electrophoresis device to the cartridge where the radioactive particles are retained by ion-exchange resin in the cartridge. The pump then draws the treated liquid out of the cartridge and to a storage vessel and/or disposal drain.

Notably, a mixed bead ion-exchange resin within the cartridge could be used to extract either negatively or positively charged radioactive particles. Other types of chromatography media, such as, hydrophobic, hydrophobic-interaction, affinity, adsorption, permeation, or perfusion, could be employed as required by the application. For example, one could use such a cartridge to extract radiolabeled DNA probes, RNA, proteins, carbohydrates and other biomolecules of interest.

The ion-exchange resin of the cartridge eventually is spent with continuous use, and can be disposed of according to the rules and regulations of the Nuclear Regulatory Commission. However, the volume of solid waste of the cartridge is much less than the volume of radioactive liquid waste that otherwise would have then been disposed of according to the same rules and regulations. In fact, the volume of radioactive waste is reduced by the present invention by about forty (40) fold. Unlike liquid radioactive waste, solid radioactive waste need not be absorbed onto a solid absorbent, such as vermiculite, before it can be transported according to the rules and regulations of the Nuclear Regulatory Commission.

The advantages over prior art apparatus include the ability to run the gel electrophoresis experiments that utilize DNA which has been generated using other sequencing methodologies without having the onerous, wasteful, expensive, time-consuming, and dangerous task of disposing radioactive liquid waste generated by gel electrophoresis, and further, protecting operators from radioactivity. The present invention teaches a radioactive waste treatment cartridge that need not be kept wet during decontamination and that can be easily used for treatment of waste from different experiments.

Moreover, a majority of DNA sequencing reactions are done using cycle sequencing methods and this is rapidly becoming the predominant method of choice. The inventors of the present invention have discovered that cycle sequencing, which involves higher temperatures than non-cycle sequencing, generates radioactive non-ionic species of S-35, such as radioactive hydrogen sulfide, and that such radioactive species are not removed from the liquid being treated using only an ion exchange resin. Thus, the inventors have discovered the source of a problem previously unknown, and have provided a solution to that problem. Specifically, the present invention teaches how to remove radioactive non-ionic species of S-35 using activated carbon.

DETAILED DESCRIPTION OF THE PREFERRED EMBODIMENTS

Figure 1:
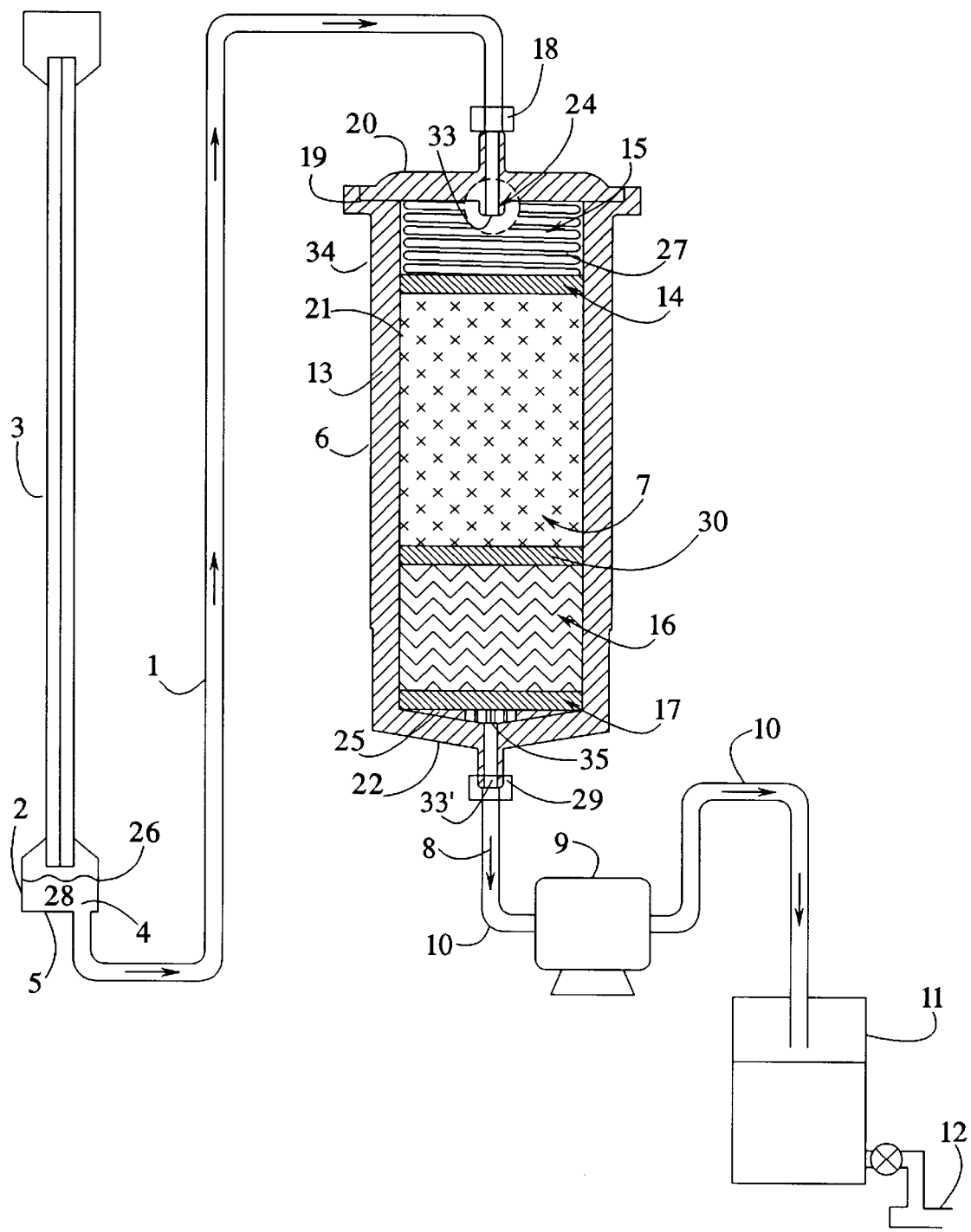
FIGS. 1 represents a side cut-away view of the preferred embodiment of the present invention.

Electrophoresis buffer solution that has become radioactive during the course of an experiment is pumped through a cartridge that extracts the radioactive components out of the liquid. FIG. 1 is a sketch of a preferred embodiment of the invention. The figure shows a tubing 1 leading from opening 4 of bottom 5 of lower buffer chamber 2 of gel electrophoresis device 3 to cartridge 6. Alternatively, opening 4 can be located at a wall 26 of the lower buffer chamber 2. As shown in FIG. 1, radioactive liquid 28 can be drawn by pump 9 from lower buffer chamber 2 and through tubing 1 to cartridge 6.

The cartridge 6 comprises an elongated chamber 21 and an anion exchange resin 7 contained within elongated chamber 21 that binds radioactive DNA in radioactive liquid 28. The elongated chamber 21 is preferably cylindrical in shape. Cartridge 6 also has an entry port 33 at a first end of cartridge 6 through which radioactive liquid 28 can enter elongated chamber 21. Cartridge 6 also has an exit port 33' at a second end of cartridge 6. Effluent 8 from the cartridge 6 is then drawn by pump 9 through exit port 33' and sent through tubing 10 into a container 11 (carboy). The effluent 8 is not radioactive and can be disposed of by sending it to a conventional drain 12. Fluid flow of liquid 28 from lower buffer chamber 2 to cartridge 6 and fluid flow of treated effluent 8 from cartridge 6 to container 11 is shown with arrows. This invention provides the user with a number of advantages previously unavailable.

In the preferred embodiment, the cartridge 6 has an upper frit 14 that is loaded by retaining spring 15 between the entry port 33 and upper frit 14 to maintain the upper frit 14 in contact with resin 7. First end 20 of cartridge 6 has an extended tip 24 that points down inside chamber 21 and which allows the entering liquid to be deposited on top and center of upper frit 14. The pressure of retaining spring 15 helps to provide a uniform bed of resin 7 so that the liquid 28 will pass uniformly through the resin 7 thereby providing for more uniform and effective adsorption of the radioactive material onto resin 7.

In a preferred embodiment, the cartridge 6 also has a layer of activated carbon 16. Activated carbon layer 16 is about 50% to 30% of the volume of resin 7 in cartridge 6 and is positioned between resin 7 and lower frit 17. As shown in FIG. 1, a middle frit 30 is used to separate resin 7 from activated carbon 16. Alternatively, middle frit 30 can be eliminated.

Activated carbon 16 acts to remove radioactive hydrogen sulfide and/or sulfides from the liquid. Cartridge 6 also has a lower frit 17 that acts with the upper frit 14 to hold resin 7 in a compacted matrix. The upper frit 14, middle frit 30, and the lower frit 17 of cartridge 6 are porous screens that retain the chromatographic resin 7 and the activated carbon 16 in their respective positions in cartridge 6 and prevent the resin 7 and the activated carbon 16 from passing through the entry port 33 and the exit port 33' at the respective first end 20 and second end 22 of cartridge 6.

Figure 2:
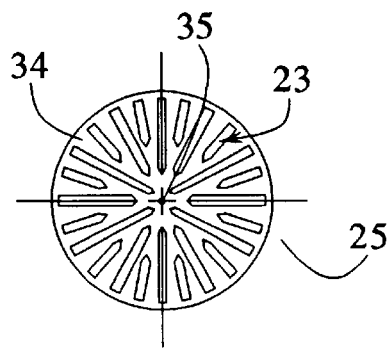
FIG. 2 represents an inside bottom view of the cartridge of the preferred embodiment of the present invention.

FIG. 2 shows the inside bottom view of support 25 of lower frit 17. As shown in FIG. 2, support 25 has raised bars 23 and channels 34 and hole 35, which, result in uniform removal of effluent 8 from lower frit 17 through hole 35, thereby permitting the effluent 8 to move in a uniform manner through cartridge 6.

Upper frit 14, middle frit 30, and lower frit 17 are preferably made of powder molded polyethylene frits commonly known to those of skill in the art.

The cartridge 6 is a canister that contains a chromatographic resin 7. The resin 7 can be one of many types depending upon the specific application. The first end 20 has an upper fitting 18 that allows the connection of tubing 1 to the cartridge 6, and second end 22 has a lower fitting 29 that allows for the connection of tubing 10 from cartridge 6, so that liquid can be pumped through the tubing 1 and 10 and through cartridge 6. An air tight seal 19 is formed between the first end 20 and cartridge body 34 by ultrasonically welding them together or sealing them together with a suitable adhesive.

The above-described construction results in a head 27 of liquid 28 forming on top of upper frit 14. A continuous vacuum is created by pump 9, which draws liquid 28 from lower buffer chamber 2, through tubing 1, through cartridge 6, and out of lower fitting 29 as treated effluent 8. Treated effluent 8 specifically flows through opening 34 of support 25, and down through lower fitting 29. Because of the head 27 created by this construction, there is a continuous flow of liquid 28 through tubing 1 and cartridge 6, and a continuous flow of treated effluent 8 out of cartridge 6 and through pump 9. This construction reduces pump cavitation and results in a uniform and an effective system for treating radioactive liquid 28 so that it becomes treated effluent 8 which has a such a low amount of radioactivity (i.e., about 20 counts/minute) that it can be disposed, after confirming the low radioactivity of treated effluent 8 collected in container 11, by sending it to a conventional drain 12. Moreover, this construction does not require that the resin be kept wet during decontamination of the liquid being treated.

The expected results of the present invention include the ability to create a vacuum and draw radioactive liquid 28 through cartridge 6 so that it exits cartridge 6 as treated effluent 8, and to do so with a pump 9 that only comes in contact with treated effluent 8.

In the preferred embodiment of the invention, the cartridge 6 is filled with the anion exchange resin from Dow Chemical Co. (Midland Mich.): Dowex™ 1x8. This resin binds DNA efficiently and is appropriate for this application. To improve resin binding of DNA, the resin is treated with acetate or formate, which then allows the resin to bind DNA with more efficiency than if the resin was treated with chloride alone.

A similar resin could be used for the binding of radioactively labeled proteins, including but not limited to, TMAE, DEAE, DMAE, hydroxylapatite, and carboxymethylcellulose. A mixed bed ion exchange could be used to bind both positively and negatively charged particles and could be used for generic applications. Those of skill in the art will recognize suitable resins for use in the present invention.

Any suitable strongly basic anion exchange resin having high capacity can be used in the present invention for the treatment of electrophoresis waste containing radiolabeled nucleotides, including, but not limited to, the Dowex™ 1x, 2x, 21K, XUS, I9680, or I0131 resins, or the Amberlite™ IRA or I6766 or Duolite™ AP-143/1083 Cholestryamine Resin USP resins made by Rohm and Haas Co. (Philadelphia, Pa.). All of these resins have quaternary amine functional groups.

In the preferred embodiment, the cartridge 6 is made of clear plexiglass having a thickness of about 1 cm. This plexiglass material and thickness is sufficient to shield the emission of radiation from radioactive waste particles retained by the exchange resin. Specifically, this material and thickness is sufficient to shield isotopes S-35, P-33, and P-32.

Any suitable material can be used in the present invention as cartridge material that functionally prevents transmission of radiation from radioactive waste particles retained by the exchange resin in the cartridge. Examples of suitable cartridge material include, but are not limited to, any plastic, such as plexiglass, acrylic, polycarbonate, polystyrene, polyethylene, polysulphone, ABS (acrylonitrile-butadiene-styrene), PVC (polyvinyl chloride), polyurethane, and polypropylene. Those of skill in the art will recognize suitable materials for the cartridge in the present invention.

Figure 3:
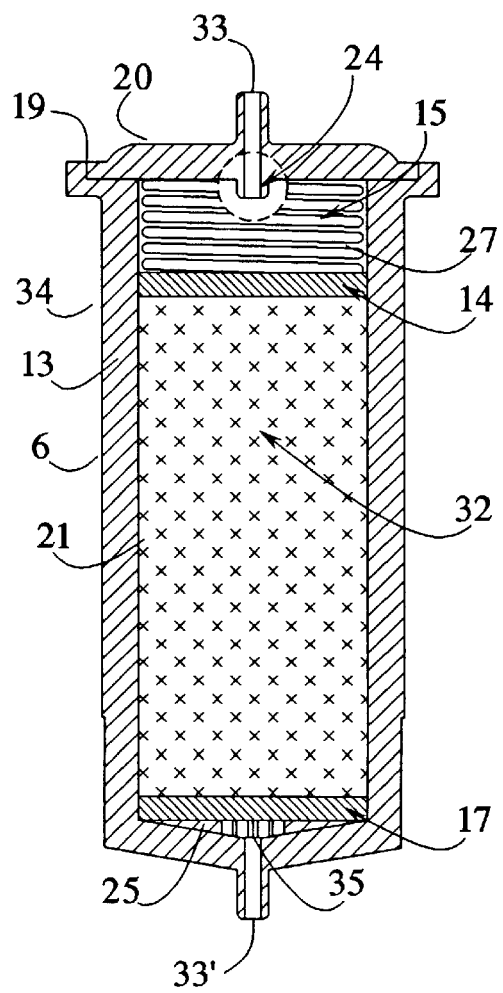
FIG. 3 is an alternative preferred embodiment of the cartridge of the present invention.

Another preferred embodiment is shown in FIG. 3, wherein there is no middle frit 30, and elongated chamber 21 of cartridge 6 contains a substantially homogeneous matrix 32, which is a mixture of resin 7 and activated carbon layer 16. Again, a head 27 forms on top of upper frit 14 when cartridge 6 is used as shown in FIG. 1.

Figure 4:
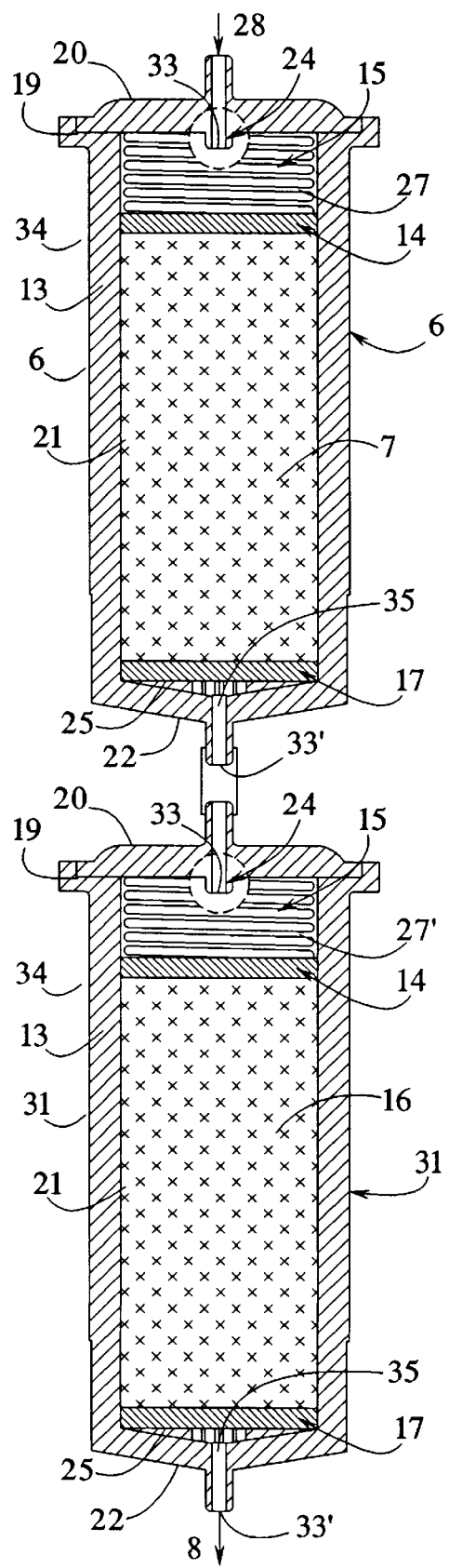
FIG. 4 is another alternative preferred embodiment of the present invention, wherein there is a first cartridge containing exchange resin and a second cartridge containing activated carbon, and the first and second cartridges are in series.

Alternatively, as shown in FIG. 4, activated carbon layer 16 can be contained in a second cartridge 31 having substantially the same construction as cartridge 6, this second cartridge 31 being positioned in series and between cartridge 6 containing resin 7 and pump 9. A second head 27' of liquid forms on top of upper frit 14 of second cartridge 31 when the embodiment shown in FIG. 4 is used.

Extraction of the radioactive waste from the radioactive liquid 28 concentrates the waste into a small, conveniently sized cartridge 6. The cartridge 6 of the preferred embodiment is sufficient to bind the waste from ten (10) different electrophoresis experiments. The cartridge 6 concentrates the waste twenty (20) fold and eliminates the need to dispose of radioactive liquids. The disposal of radioactive liquid is more costly than the disposal of radioactive solids. Radioactive liquids must be absorbed onto a solid adsorbent such as vermiculite before it can be transported and this effectively doubles the volume of the waste. Thus, the cartridge reduces the volume of radioactive waste by about forty (40) fold.

The cartridge 6 also makes disposal of radioactive waste safer. Instead of handling liters of radioactive liquid, an operator need only handle a relatively easy to handle cartridge (the cartridge is a cylinder that is about 5–10 inches long and about 2 inches in diameter). The radioactive decay particles being emitted from the DNA that is trapped inside of the cartridge 6 is of a low energy variety that cannot penetrate the walls 13 of the cartridge 6. Thus, when it is time to dispose of the cartridge 6 it can be handled without fear of exposure to harmful radioactive particles.

Figure 5:
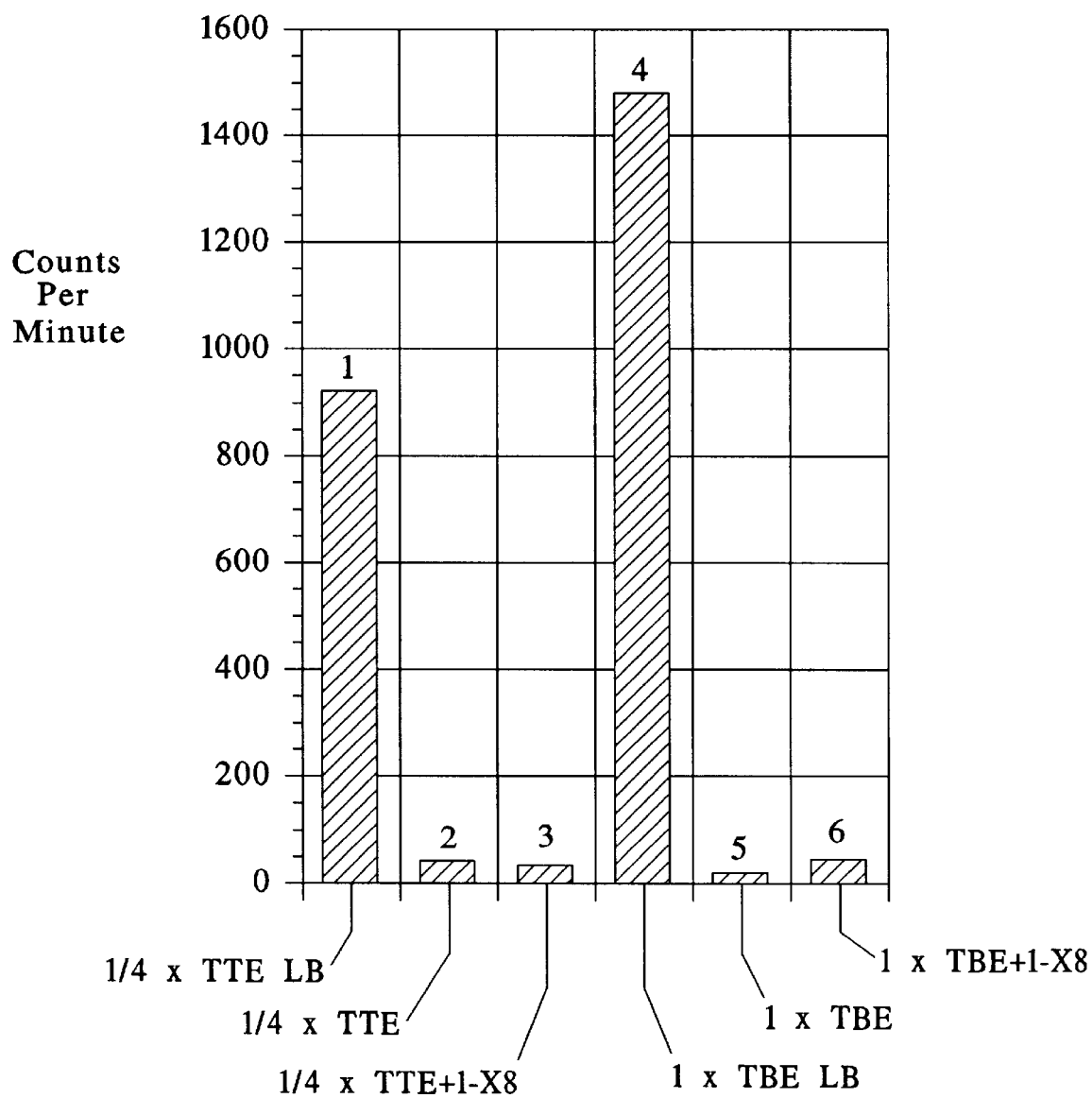
FIG. 5 is a graphic representation of how the present invention can be used to extract radionucleotides from electrophoresis buffers.

In order to test the performance of the cartridge 6, fluid containing a known quantity of radioactivity was pumped through the cartridge and the radioactivity of the effluent that emerged was measured. A properly designed cartridge will extract all of the radioactivity from the waste stream. FIG. 5 demonstrates the performance of the cartridge 6 during two separate experiments. The radioactivity was measured using a Liquid Scintillation Counter and is expressed in units of "counts per minute." Column 1 shows the activity of a buffer (¼×TTE) before it was pumped through the cartridge, column 2 is ¼×TTE that contains no radioactivity (the negative control), and column 3 is the effluent from the cartridge. Column 4 is a different radioactive buffer (1×TBE) before passage through the cartridge, column 5 is that same buffer without radioactivity (the negative control), and column 6 is the effluent from the cartridge. Radionucleotides were extracted from both ¼×TTE and 1×TBE using BioRad™ AG 1-X8 anion exchange resin. Electrophoresis buffers containing radionucleotides from DNA sequencing were collected from the lower buffer chambers. The radioactive buffers (designated LB in FIG. 5) were then passed through chromatography columns containing AG 1-X8 resin and the elute was collected (designated+1-X8 in FIG. 5). It is noted that the 1×TBE LB was extracted with equal efficiency in spite of the fact that both its salt and nucleotide contents were higher than that of ¼×TTE LB. In both cases the cartridge removed substantially all of the radioactivity from the buffers. In fact, the radioactivity has been reduced to a level where it can be disposed of to a conventional drain.

Electrophoresis waste generated in a typical DNA sequence run, and which is comprised of a buffer solution (1×TTE or 1×TBE) containing radiolabeled nucleotides, typically has a radioactivity of about 10,000 counts per minute (cpm) per 100 microliters. The present invention is suitable for treating such waste and reducing the radioactivity of the buffer solution to the level of about 20 cpm per 100 microliters.

Those of skill in the art will recognize that the present invention can be used to treat other buffer solutions having the same or similar salt content. Those of skill in the art will also recognize that the present invention can be used to treat any electrophoresis solution generated from electrophoresis of both vertical or horizontal agarose or acrylamide gels.

Figure 6:
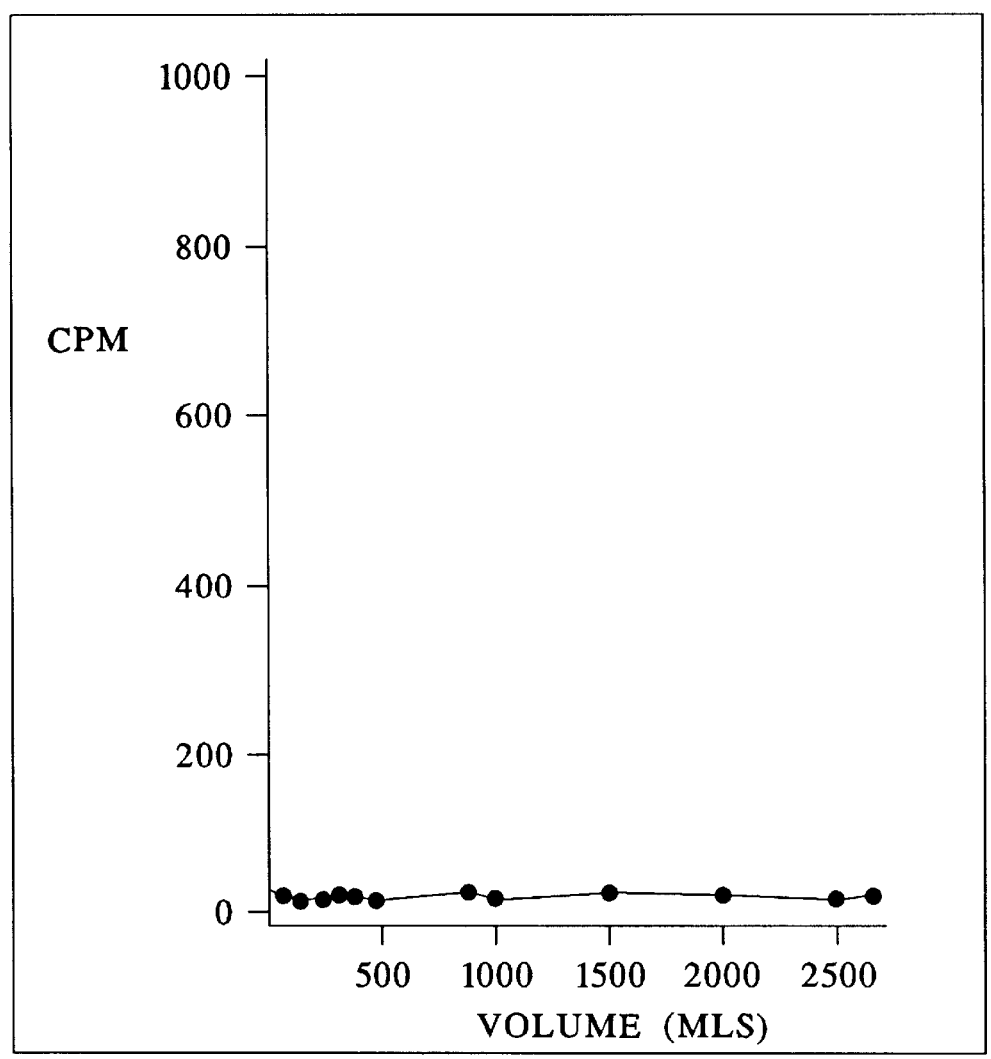
FIGS. 6, 7 and 8 show the performance of the cartridge of the present invention when a large amount of electrophoresis buffer is passed through the cartridge.

FIG. 6 shows the performance of the cartridge 6 when a large amount of electrophoresis buffer is passed through it. In this experiment 2650 mls of radioactive buffer was passed through the cartridge 6 and the effluent 8 was still devoid of radioactivity. This experiment demonstrates that the cartridge 6 has sufficient binding capacity to remove all of the radioactive nucleotides and DNA fragments from ten (10) consecutive experiments or "runs" or "long reads" (taking about 16 hours to conduct). The following Table 2 lists the data points shown in FIG. 6.

TABLE 2

| Point | Counts/Minute | Volume (mls) |
| --- | --- | --- |
| 0 | 25 | 70 |
| 1 | 20 | 140 |
| 2 | 20 | 230 |
| 3 | 24 | 310 |
| 4 | 24 | 380 |
| 5 | 18 | 470 |
| 6 | 28 | 870 |
| 7 | 18 | 1000 |
| 8 | 26 | 1500 |
| 9 | 24 | 2000 |
| 10 | 18 | 2500 |
| 11 | 21 | 2650 |

Figure 7:
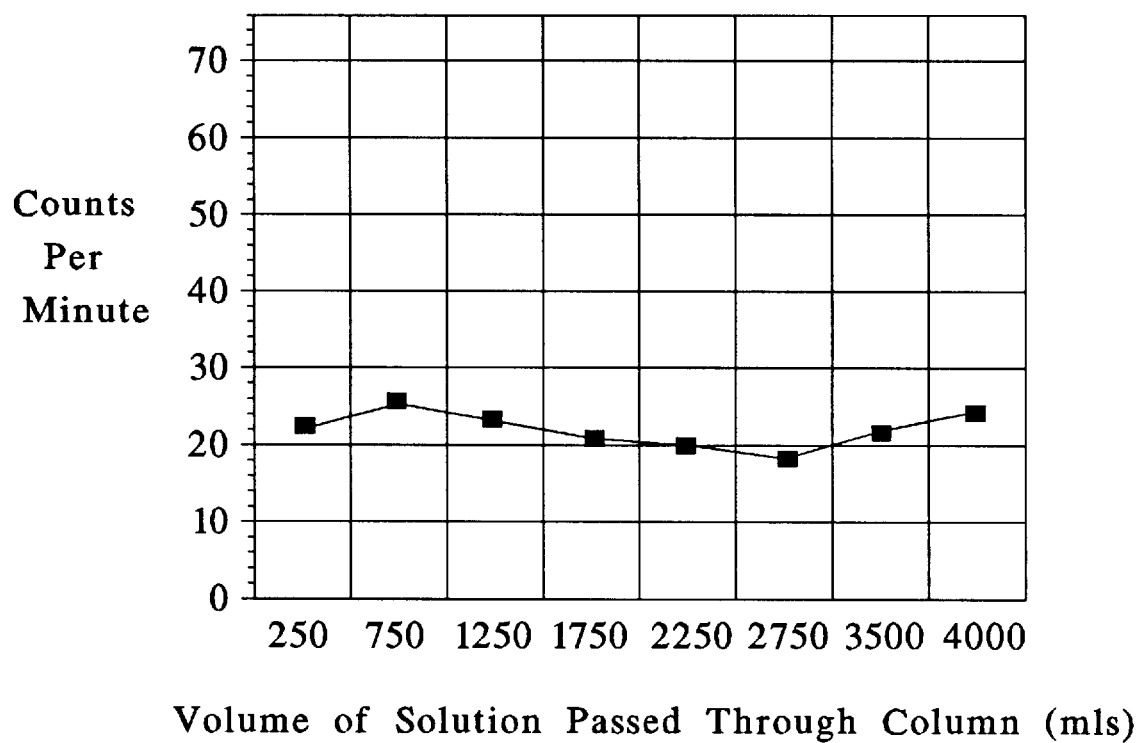

FIG. 7 is another example showing the performance of the cartridge 6 when 4000 mls of electrophoresis buffer is passed through it. In this experiment 4000 mls of radioactive buffer was passed through the cartridge 6 and the effluent 8 was still devoid of radioactivity. The 4000 mls of electrophoresis buffer solution contained Sulfur-35 radioactive nucleotides and DNA was passed through a cartridge 6 containing both Dowex 1-X8 and 14-60 mesh charcoal. The specific activity of the buffer solution was 6731 counts per minute before passage through the cartridge 6. This experiment also demonstrates that the cartridge 6 has sufficient binding capacity to remove all of the radioactive nucleotides and DNA fragments.

Figure 8:
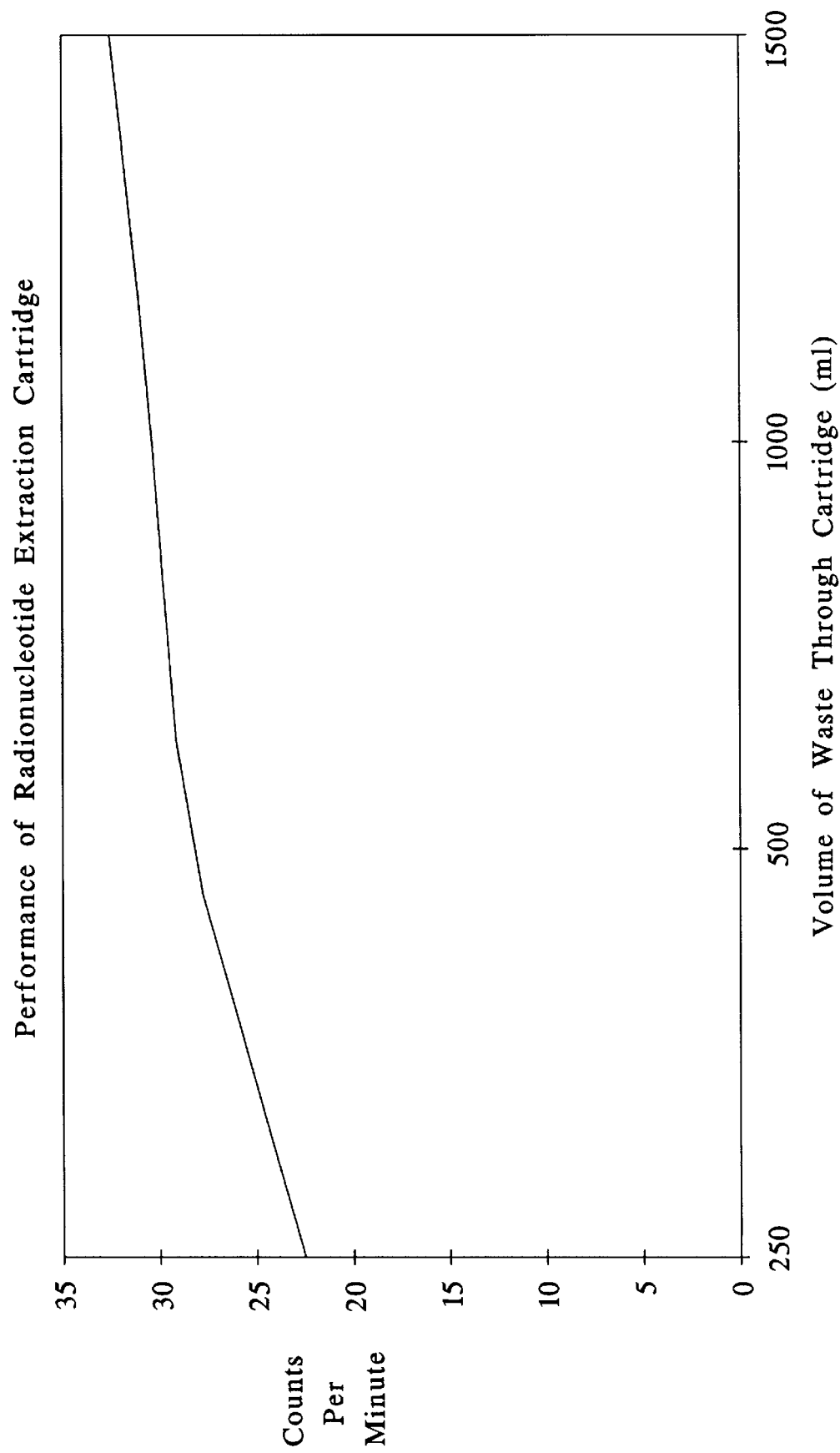

FIG. 8 is yet another example of the performance of cartridge 6 in the present invention. In this example, the cartridge was successful in substantially reducing the radioactivity of a solution containing isotope P-33 having an initial level of 160,417 counts per minute down to the background level of about 25 counts per minute.

The foregoing detailed description of the invention has been made in general terms and with respect to several preferred embodiments. Many of the preferred apparatuses and methods stated herein may be varied by persons skilled in the art without departing from the spirit and scope of the present invention as set forth in the following claims and equivalents.

What is claimed is:

1. A radioactive waste treatment cartridge comprising:
   an elongated chamber having an entry port and an exit port which define an axis through the elongated chamber,
   an anion exchange resin within the elongated chamber and maintained between a porous upper frit and a porous lower frit, the exchange resin having the property of binding radioactive waste particles, the exchange resin also defining a cross section perpendicular to the axis defined by the entry port and the exit port, the entry port having a tip that points down inside the chamber and through which entering radioactive liquid is deposited on top and center of the porous upper frit, the porous upper frit having sufficient thickness and porosity to create a liquid head on top of the porous upper frit and in which the liquid head has a cross section parallel to and substantially coextensive with the cross section of the exchange resin, and
   a means within the elongated chamber for retaining pressure between the porous upper frit and the porous lower frit, wherein radioactive waste particles are retained within the elongated chamber by the exchange resin when radioactive liquid is passed from the entry port to the exit port and through the exchange resin and wherein the elongated chamber is made of material which shields the emission of radiation from radioactive waste particles retained by the exchange resin.

2. The radioactive waste treatment cartridge of claim 1, wherein the exchange resin contains the acetate ion.

3. The radioactive waste treatment cartridge of claim 1, wherein the exchange resin contains the formate ion.

4. The radioactive waste treatment cartridge of claim 1 wherein the means within the elongated chamber for retaining pressure between the upper frit and the lower frit comprises a retaining spring between the entry port and the upper frit.

5. The radioactive waste treatment cartridge of claim 1 wherein the means within the elongated chamber for retaining pressure between the upper frit and the lower frit is a cylindrical spring.

6. A radioactive waste treatment cartridge according to claim 1 further comprising a mixed-bed exchange resin.

7. A radioactive waste treatment cartridge according to claim 1 further comprising a cation exchange resin.

8. A radioactive waste treatment cartridge comprising:

an elongated chamber having an entry port and an exit port which define an axis through the elongated chamber, an anion exchange resin within the elongated chamber and maintained between a porous upper frit and a porous lower frit, the exchange resin having the property of binding radioactive waste particles, the change resin also defining a cross section perpendicular to the axis defined by the entry port and the exit port, the entry port having a tip that points down inside the chamber and through which entering radioactive liquid is deposited on top and center of the porous upper frit, the porous upper frit having sufficient thickness and porosity to create a liquid head on top of the porous upper frit and in which the liquid head has a cross section parallel to and substantially coextensive with the cross section of the exchange resin, and a means within the elongated chamber for retaining pressure between the porous upper frit and the porous lower frit, an activated carbon layer positioned between the upper frit and the lower frit, and wherein the radioactive waste particles are retained within the elongated chamber by the exchange resin or activated carbon layer when radioactive liquid is passed from the entry port to the exit port and through the exchange resin and wherein the elongated chamber is made of material which shields the emission of radiation from radioactive waste particles retained by the exchange resin or activated carbon layer.

9. The radioactive waste treatment cartridge of claim 8, wherein the activated carbon layer is positioned between the exchange resin and the lower frit.

10. The radioactive waste treatment cartridge of claim 8, wherein a middle frit separates the exchange resin from the activated carbon layer.

11. The radioactive waste treatment cartridge of claim 8, wherein the exchange resin and the activated carbon layer form a substantially homogeneous matrix within the cartridge and between the upper frit and the lower frit.

12. The radioactive waste treatment cartridge of claim 8, wherein the activated carbon layer is about fifty to thirty percent of the volume of the exchange resin.

13. The radioactive waste treatment cartridge of claim 8, wherein the activated carbon layer is about thirty percent of the volume of the exchange resin.

14. A radioactive waste treatment cartridge according to claim 8 further comprising a mixed-bed exchange resin.

15. A radioactive waste treatment cartridge according to claim 8 further comprising a cation exchange resin.

* * * * *